United States Patent
Chintakrindi et al.

(10) Patent No.: US 6,704,117 B1
(45) Date of Patent: *Mar. 9, 2004

(54) SYSTEM AND METHOD FOR SERVER VIRTUAL PRINTER DEVICE NAME NEGOTIATION FOR MOBILE PRINT SUPPORT

(75) Inventors: Rao Sivasankar Chintakrindi, Vestal, NY (US); Thomas Edwin Murphy, Jr., Binghamton, NY (US); Paul Francis Rieth, Apalachin, NY (US); Jeffrey Scott Stevens, Endwell, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1040 days.

(21) Appl. No.: 08/977,547

(22) Filed: Nov. 25, 1997

(51) Int. Cl.$^7$ ................................................ G06K 15/00
(52) U.S. Cl. ...................... 358/1.15; 709/227; 709/228; 709/230
(58) Field of Search ................ 395/114, 112, 395/115, 200.36; 709/228, 200, 220, 221, 222, 223, 213, 227; 710/9, 10, 3, 36; 703/23, 24, 25

(56) References Cited

U.S. PATENT DOCUMENTS

| | | | | |
|---|---|---|---|---|
| 5,371,837 A | * | 12/1994 | Kimber et al. | 395/114 |
| 5,450,571 A | * | 9/1995 | Rosekrans et al. | 395/112 |
| 5,467,434 A | * | 11/1995 | Hower, Jr. et al. | 395/114 |
| 5,638,497 A | * | 6/1997 | Kimber et al. | 395/114 |
| 5,715,379 A | * | 2/1998 | Pavlovic et al. | 395/114 |
| 5,771,354 A | * | 6/1998 | Crawford | 395/200.59 |
| 5,790,790 A | * | 8/1998 | Smith et al. | 395/200.36 |
| 5,796,742 A | * | 8/1998 | Klotzbach et al. | 370/466 |
| 5,825,991 A | * | 10/1998 | Plakosh et al. | 395/112 |

OTHER PUBLICATIONS

Troll, D.A. et al. *TULIP at Carnegie Mellon*, Libr. Hi Tech (USA), vol. 13, No. 4 1995, INSP abstract INS 955001496.
Morse, P. *TCP/IP (Technology Information)*, Enterprise Systems Journal, No. 3, vol. 11, Mar., 1996, p. 32(4), ISSN 1053–6566.
Postel, J. et al. *Telnet Protocol Specification*, Network Working Group RFC 854 (May 1983).
Postel, J. et al. *Telnet Option Specifications*, Network Working Group RFC 855 (May 1983).
Postel, J. et al. *Telnet Binary Transmissions*, Network Working Group RFC 856 (May 1983).
Solomon, M. et al. *Telnet Terminal Type Option*, Network Working Group RFC 884 (Dec. 1983).
Postel, J. *Telnet End of Record Option*, Network Working Group RFC 885 (Dec. 1983).
McLaughlin L., III. *Line Printer Daemon Protocol*, Network Printing Work, RFC 1179 (Aug. 1990).
Chmieleski, P. *5250 Telnet Interface*, Network Working Group RFC 1205 (Feb. 1991).
Alexander, S. *Telnet Environment Option*, Network Working Group RFC 1572 (Jan. 1994.).
J. Reynolds, et al. *Assigned Numbers*, Network Working Group RFC 1700 (Oct. 1994.).

* cited by examiner

Primary Examiner—David Moore
Assistant Examiner—King Y. Poon
(74) Attorney, Agent, or Firm—Shelley M Beckstrand

(57) ABSTRACT

Client/server negotiation of virtual display and/or printer device selection to control session attributes, job routing to customized subsystems, user access control, and so forth. Within the Telnet Protocol, sanctioned and used with the "DO, DONT, WILL, WONT" structure, during subnegotiation a client requests and a server agrees to a specific virtual device name for the session display and/or printer.

13 Claims, 12 Drawing Sheets

SYSTEM AND METHOD FOR SERVER VIRTUAL PRINTER DEVICE NAME NEGOTIATION FOR MOBILE PRINT SUPPORT

CROSS-REFERENCES TO RELATED APPLICATIONS

U.S. patent application Ser. No. 08/978,251, entitled "System and Method for Server Virtual Device Name Negotiation", and filed concurrently herewith is assigned to the same assignee hereof and contains subject matter related, in certain respect, to the subject matter of the present application. The above-identified patent application is incorporated herein by reference.

BACKGROUND OF THE INVENTION

1. Technical Field of the Invention

This invention pertains to virtual device selection in a client/server environment. More specifically, the invention pertains to client/server negotiation of virtual display, printer and/or terminal device selection to control session attributes, job routing to customized subsystems, user access control, and so forth.

2. Background Art

The growth of the Internet has resulted in a corresponding rise in need for TCP/IP applications and support tools.

In accordance with Telnet Protocol Specification (RFC 854), a fairly general, bi-directional, eight-bit byte oriented communications facility is described. Its primary goal is to allow a standard method of interfacing terminal devices and terminal oriented processes to each other.

In accordance with Telnet Option Specification (RFCs 854 and 855), a method of option code assignment and standards for documentation of options are described.

In accordance with 5250 Telnet Interface (RFC 1205), the interface to the IBM 5250 Telnet implementation is described. To enable 5250 mode, both client and server agree to support the Binary, End-Of-Record (EOR), and Terminal-Type Telnet options described in RFCs 856, 885, and 884, respectively. A partial list of 5250 terminal types is maintained in Assigned Numbers RFC 1700. More terminal types are also found in the OS/400 TCP/IP Configuration and Reference (IBM publication SC41-5420) chapter on Telnet Server, under "Workstation Type Negotiations and Mappings".

In accordance with RFC 1572, there is provided a method for negotiating options allowing hosts to provide additional services over and above those available within a Network Virtual Terminal (NVT) and which allows users with sophisticated terminals to receive elegant, rather than minimal, services.

There is a need in the art to provide a method for inviting any Telnet Client (including 5250, 3270, Vtxxx based) to negotiate Telnet device name and secondary NLS language selection in a TCP/IP or the like environment. Such a pure TCP/IP solution is needed to eliminate the need for other protocol software to be purchased and installed while allowing full terminal device support for all kinds of new clients.

Currently, IBM AS/400 Telnet sessions use a virtual device naming convention of QPADEVnnnn, where "nnnn" typically varies each time the user starts a Telnet session, depending on what device is free or available. Under Telnet (TCP/IP), customers cannot choose or select a particular device name for their Telnet sessions. Consequently, customers are not able to start specific jobs based upon the device name, restrict application access based on device name (for example, based upon the location of the device), or select terminal and keyboard language information of this device (because virtual devices have National Language Support attributes already associated with them.) This lack of virtual device selectability limits client function and flexibility of client applications, and increases service costs associated with the AS/400.

By comparison, the IBM System Network Architecture (SNA) sessions can be named by customers, but TCP/IP sessions currently cannot be named by customers since no standard or solution for Telnet exists. Whereas in Telnet the device name (as distinguished, of course, from device type) is selected from a general pool of names by the operating system at the server, the SNA processes for connecting with bind allows for the passing of data which may include a device name. This difference in work management functionality renders impractical migration from an SNA to a TCP/IP environment of legacy applications and veteran Client Access users having available to them several important functions over SNA connections find they are not available to them if they choose native TCP/IP support. The principle deficiency is the inability to define 5250 printer emulation sessions. Moreover, even in the SNA architecture, if a client requests a session or device name, and the server does not accept or grant the requested name, the client/server connection is broken, there being no provision for retrying. Therefore, there is a need in the art for a way to migrate from an SNA to a TCP/IP environment without losing work management functionality.

More specifically, with respect to printing functions, while TCP/IP is a very simple and standard protocol accepted by the industry, which removes proprietary hardware and software requirements in communications, resulting in "open" systems architecture, many intranet and Internet software applications have a need for more and better print support over TCP/IP.

In particular, customers need a mechanism to support printing while using Telnet. Often, files for printing are created during a Telnet session on a remote system, but need to be printed on a local printer. With the development of the Dynamic Host Configuration Protocol (DHCP), TCP/IP Telnet clients have become more mobile in the sense that there is no fixed configuration associated with these clients. A good example would be the new Network Computer (NC) developed for the Internet. This NC is essentially a "thin client", one whose configuration is dependent upon the network in which it exists. For such clients, there is the need to define a local printer and a method for printing to it.

The capability to print remote files on a local printer over a TCP/IP network either does not exist, or is defined by the LPR/LPD protocol set forth in RFC 1179. This protocol is too limited in function to support most new printers with sophisticated features. In addition, the LPR/LPD protocol requires knowledge of network topology and that additional steps be taken to initiate the print functions for each file. For DHCP clients, printing becomes a repetitive task to initiate and presents a configuration problem with LPR/LPD. Furthermore, as no new RFC for printer support over TCP/IP appears on the horizon from the Internet Engineering Task Force (IETF), a new RFC would take years to become an industry accepted standard for printing.

Current alternative print solutions such as Client Access/400 require that additional network transport protocols, like the IBM System Network Architecture (SNA), be loaded or supported in addition to TCP/IP. This can result in complexity, additional expense and lack of open architecture for customers. Client Access/400 supports remote-to-local print functions, but only by using special printer pass thru services over the SNA protocol. By comparison, the SNA protocol is much larger and more complex than the TCP/IP protocol, and therefore requires much more support to configure and maintain. There is a need in the art for a print solution facilitating migration away from SNA and dependent terminals to the more flexible TCP/IP used to run intranets without almost total loss of the rich print functionality of SNA.

Consequently, it is an object of the invention to provide a system and method whereby user customers may choose or select a particular virtual device name for their Telnet sessions.

It is a further object of the invention to provide a system and method for allowing full terminal device support for all kinds of new clients. It is a further object of the invention to provide such full terminal device support without impacting legacy clients, those not configured to take advantage of the new functions provided by the system and method of the invention.

It is a further object of the invention to provide an improved system and method for defining a local printer and for printing to it.

It is a further object of the invention to facilitate migration from SNA to TCP/IP without loss of print functionality.

It is a further object of the invention to provide an improved system and method for selecting or creating and naming virtual devices, including setting client keyboard, code page and character set at display device creation time, and printer manufacturer, type and model, printer font, and forms type at printer device creation time.

SUMMARY OF THE INVENTION

System and method for printing to a virtual printer device in a system including a server and a client, including establishing a connection between the client and the server; establishing agreement between the server and the client to negotiate options; communicating a printer device name from the client to the server for a virtual printer device associated with the client; operating a display server selectively for communicating with a virtual display device and, responsive to a user request for printing a file, for communicating with the virtual printer device.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
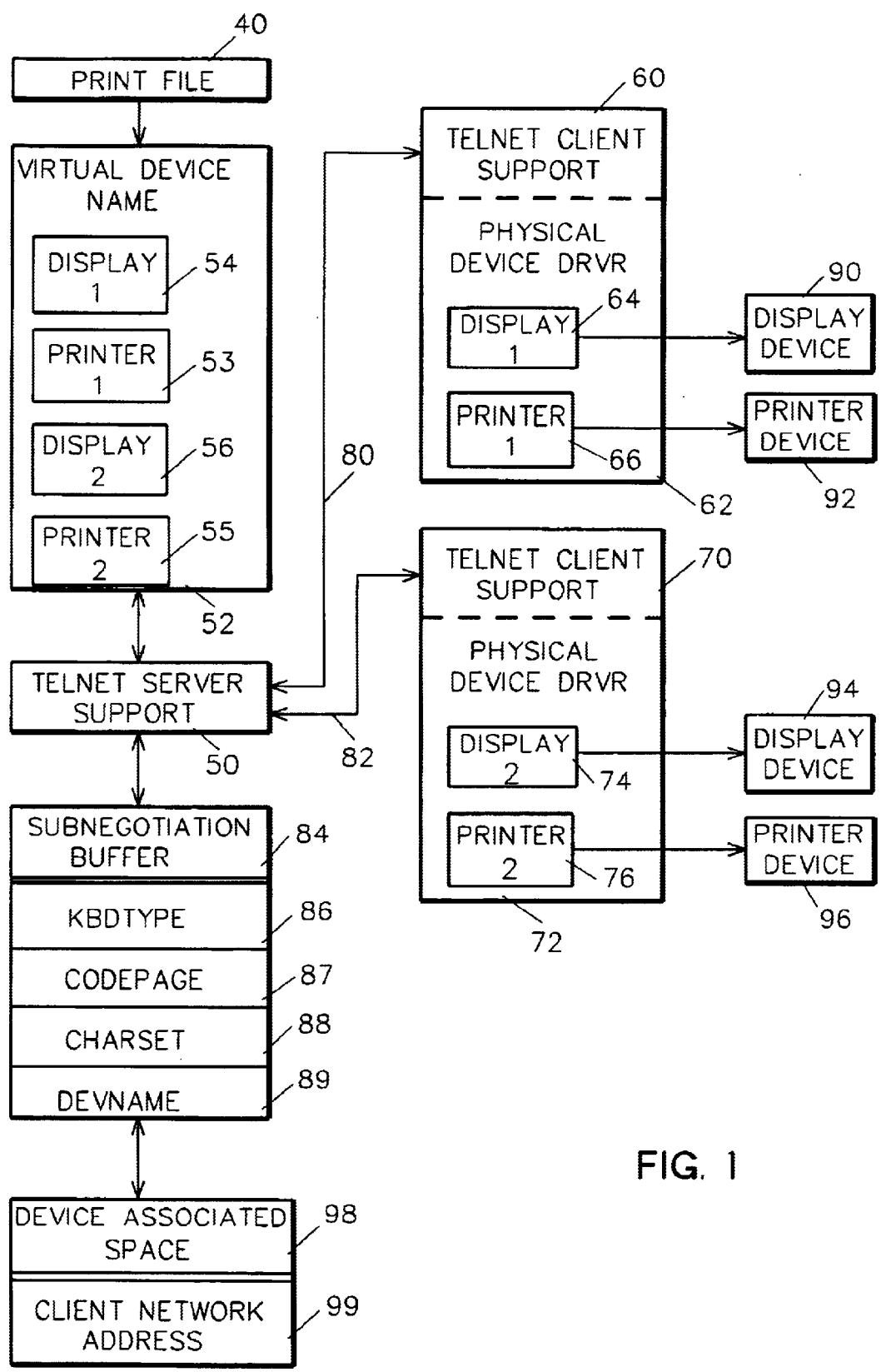
FIG. 1 is a high level system diagram illustrating a client/server system.

Referring to FIG. 1, Telnet clients 60 and 70 are connected to Telnet server 50 by TCP/IP communication links 80 and 82, respectively. At client 60, physical device drivers 62 include display 1 driver 64 connected to physical display device 90 and printer 1 driver 66 connected to physical printer device 92. At client 70, physical device drivers 72 include display 2 driver 74 connected to physical display device 94 and printer 2 device driver 76 connected to physical printer device 96. At server 50, virtual devices 52 include display 1 54, printer 1 53, display 2 56 and printer 2 55. These virtual devices 52 represent device support application code in server 50.

In operation, by way of an introductory overview, client 60 logs on to server 50, runs an application which creates, for example, a print file 40. Print file 40 is fed to virtual printer 1 53 which sends it over network 80 to printer 1 driver 66 to be printed at printer device 92.

Client 60 uses standard RFCs to request one of the virtual device names 53–56. These device names 53–56 represent a particular device 90–96 that exists on the client system. If the virtual device name 53–56 does not exist for a device 90–96 when requested, it is created.

Further in operation, Telnet server 50 receives a device specific datastream and sends it to virtual device 52. Virtual device 52 processes the data and builds a corresponding datastream that is returned to Telnet client 60. Depending upon the virtual device name 52 selected, the datastream can be a display datastream from virtual device 54 directed to driver 64 and display 90, or a printer datastream from virtual device 53 directed to driver 66 and device 92.

In RFC 854, the concept of a Network Virtual Terminal (NVT) is described. An NVT is an imaginary device which provides a standard, network-wide, intermediate representation of a canonical terminal. This eliminates the need for "server" and "user" hosts to keep information about the characteristics of each other's terminals and terminal handling conventions. All hosts, both user and server, map their logical device characteristics and conventions so as to appear to be dealing with an NVT over the network, and each can assume a similar mapping by the other party. The NVT is intended to strike a balance between being overly restrictive (not providing hosts a rich enough vocabulary for mapping into their local character sets), and being overly inclusive (penalizing users with modest terminals). As used herein, the "user" host is the host to which the physical terminal is normally attached, and the "server" host is the host which is normally providing some service. In applications involving terminal-to-terminal or process-to-process communications, the "user" host is the host which initiates the communication.

Also, in RFC 854, the principle of negotiated options is described. Some hosts will wish to provide services additional to those available within an NVT, and some users will have sophisticated terminals and would like to have elegant, rather than minimal, services. To set up the use of an option, either party initiates a request that some option take effect. The other party may then either accept or reject the request. If the request is accepted the option immediately takes effect; if it is rejected the associated aspect of the connection remains as specified for an NVT. A party may always refuse a request to enable, and must never refuse a request to disable some option since all parties must be prepared to support the NVT.

The structure for communicating option status and changes involves the TELNET commands WILL, WONT, DO, and DONT. A TELNET command includes at least a two byte sequence: the Interpret As Command (IAC) escape character followed by the code for the command.

WILL (option code) indicates a desire to begin performing the option, or confirms that the option is now being performed.

WONT (option code) indicates a refusal to perform or to continue performing the option.

DO (option code) indicates a request that the other party perform the option, or confirms that the other party is expected to perform the option.

DONT (option code) indicates a demand that the other party stop performing the option, or confirms that the other party is no longer expected to perform the option.

RFC 855 describes a subnegotiation procedure for enabling more elegant communication solutions between dissimilar devices than is possible within the framework provided by RFC 854 for Network Virtual Terminals (NVT), where a single option code is communicated.

Subnegotiation occurs in accordance with the following steps. First, the parties agree to discuss parameters in the normal manner: one party proposes the use of the option by sending a DO or WILL followed by the option code, and the other party accepts by returning a WILL or DO followed by the option code. Once both parties have agreed to use the option, subnegotiation takes place by using the command Subnegotiation Begin (SB), followed by the option code, followed by the parameter(s), followed by the command Subnegotiation End (SE). Each party is able to parse the parameter(s), since each has indicated by the initial exchange of WILL and DO that the option is supported. Alternatively, the receiver may locate the end of a parameter string by searching for the SE command (that is, the string IAC SE), even if the receiver is unable to parse the parameters. Either party may refuse to pursue further subnegotiation at any time by sending a WONT or DONT to the other party. Thus, for option "ABC", which requires subnegotiation to pass a parameter list in addition to the option code, the following TELNET commands may be passed:

IAC WILL ABC

IAC DO ABC

IAC SB ABC <parameters> IAC SE

In this sequence, an offer to use ABC is followed by a favorable acknowledgment of the offer, which is followed by one step of negotiation.

Alternatively, the sequence of commands may be:

IAC DO ABC

IAC WILL ABC

IAC SB ABC <parameters> IAC SE

A request for the other party to use option ABC is followed by a favorable acknowledgment of the request, which is followed by one step of negotiation.

RFC 1205 describes the IBM 5250 TELNET interface. To enable 5250 mode, both the client and the server agree to at least support the Binary, End-of-Record (EOR), and Terminal-Type Telnet options set forth in RFCs 856, 885, and 884, respectively.

With the binary transmission option in effect, the receiver interprets characters received from the transmitter which are not preceded with IAC as 8 bit binary data, with the exception of IAC followed by IAC which stands for the 8 bit binary data with the decimal value 255. IAC followed by an effective TELNET command (plus any additional characters required to complete the command) is still the command even with the binary transmission option in effect. The meanings of WONT and DONT are dependent upon whether the connection is presently being operated in binary mode or not. When a connection is not presently operating in binary mode, the default interpretation of WONT and DONT is to continue operating in the current mode, whether it is NVT ASCII, EBCDIC, or some other mode. Once a connection is operating in a binary mode as agreed to by both parties, a WONT or DONT causes the encoding method to revert to NVT ASCII.

With the TELNET End-of-Record (EOR) option in effect on a connection between a sender of data and the receiver of the data, the sender transmits EORS. Otherwise, EORs are interpreted as null operations (NOPs.)

The TERMINAL-TYPE option allows a TELNET server to determine the type of terminal connected to a user TELNET terminal. The information obtained may be passed to a process, which may alter the data it sends to suit the particular characteristics of the terminal. By using the TERMINAL-TYPE and BINARY options, a TELNET server program may arrange to have terminals driven as if they were directly connected, including such special functions as cursor addressing, multiple colors, etc. not included in the Network Virtual Terminal (NVT) specification. WILL and DO are used to obtain and grant permission for future discussion, and the actual exchange of status information occurs within option subcommands (IAC SB TERMINAL-TYPE . . . ). A list of valid terminal types is found in the latest Assigned Numbers RFC (currently RFC 1700.)

An example of a typical negotiation process to establish 5250 mode of operation for a client having an IBM 5251-11 terminal is as follows. In this example, the server initiates the negotiation by sending the DO TERMINAL-TYPE request.

| Server: | IAC DO TERMINAL-TYPE |
| Client: | IAC WILL TERMINAL-TYPE |
| Server: | IAC SB TERMINAL-TYPE SEND IAC SE |
| Client: | IAC SB TERMINAL-TYPE IS IBM-5251-11 IAC SE |
| Server: | IAC DO END-OF-RECORD |
| Client: | IAC WILL END-OF-RECORD |
| Server: | IAC WILL END-OF-RECORD |
| Client: | IAC DO END-OF-RECORD |
| Server: | IAC DO TRANSMIT-BINARY |
| Client: | IAC WILL TRANSMIT-BINARY |
| Server: | IAC WILL TRANSMIT-BINARY |
| Client: | IAC DO TRANSMIT-BINARY |

Figure 2:
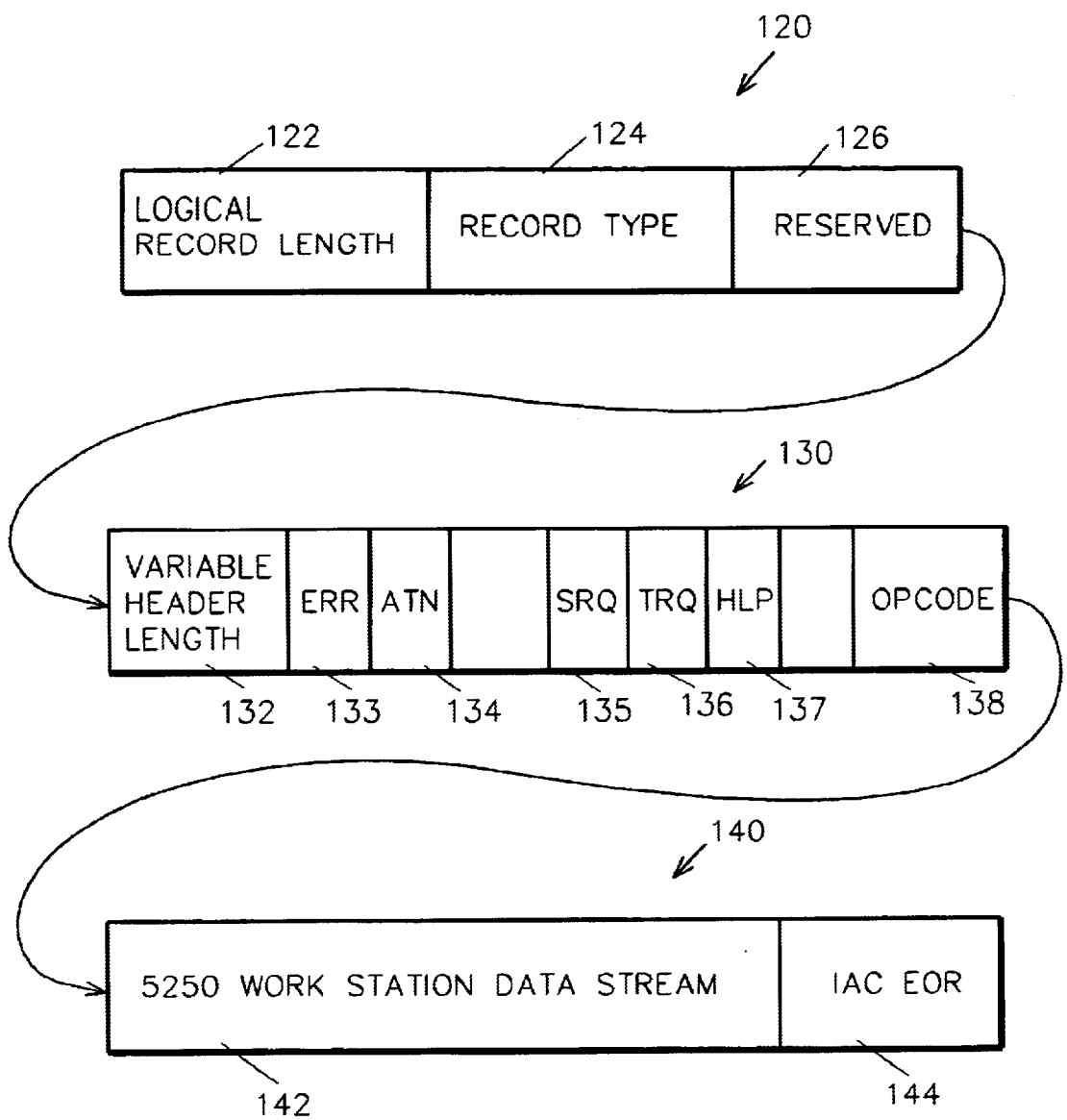
FIG. 2 is a format of a 5250 data stream.

Referring to FIG. 2, the data stream that is exchanged between a client and server includes a header 120, 130 followed by the 5250 work station data stream 140. The header is designed to be variable in length and includes two parts.

The first, fixed part 120 is always six octets long and includes logical record length field 122, record type 124, and a reserved (not used) field 126. Length field 122 is the length, in octets, of this logical record including the header length 122, and is calculated before doubling any IAC characters in the data stream but does not include the <IAC><EOR> field 144 that is appended to the end of the data stream 142 to mark the end of this logical record. Record type field 124 is the SNA record type, and for the purposes of the description of this embodiment of the invention is set to '12A0'x to indicate the General Data Stream (GDS) record type.

The second, variable part 130 of the header includes variable header length field 132, and currently is set to '04'x. Flags 133–137 include ERR 133, ATN 134, SRQ 135, TRQ 136 and HLP 137. ERR 133 is set to indicate a data stream output error. The negative response code is sent as data 142 following opcode field 138. ATN 134 is set to indicate that the 5250 attention key was pressed. SRQ 135 is set to indicate that the 5250 system request key was pressed. TRQ 136 is set to indicate that the 5250 test request key was pressed. HLP 137 is set to indicate help in error state function. The error code is sent as data 142 following the header 130.

OPCODE 138 is set to one of the following valid values to indicate the type of operation requested by the sender:

| | |
|---|---|
| '00'x: | No operation |
| '01'x: | Invite operation |
| '02'x: | Output only |
| '03'x: | Put/Get operation |
| '04'x: | Save screen operation |
| '05'x: | Restore screen operation |
| '06'x: | Read immediate operation |
| '07'x: | Reserved |
| '08'x: | Read screen operation |
| '09'x: | Reserved |
| '0A'x: | Cancel invite operation |
| '0B'x: | Turn on message light |
| '0C'x: | Turn off message light | where "x" indicates hexadecimal notation.

The actual work station data stream 142 follows the opcode field 138 in the header and is terminated by the <IAC><EOR> character pair 144. For some operations, header 130 will be followed immediately by <IAC><EOR> without any 5250 work station data stream 142.

In accordance with the invention, the IBM AS/400 Telnet server and clients that use Telnet are enhanced to enable Telnet clients to negotiate with the Telnet server to exploit virtual device selection. This gives the Telnet client the ability to select the device and control work management on the AS/400 system. Work management control means control over session attributes, job routing to customized subsystems, user access control, and so forth.

Further in accordance with an examplary embodiment of the invention, independent of but structured within the Telnet Protocol are various options that are sanctioned and used with the "DO, DONT, WILL, WONT" structure to allow a user and server to agree to use a different or more elaborate set of conventions for their Telnet connection. Such options may include changing the character set, echo mode, and so forth.

Referring further to FIG. 1, in accordance with a specific embodiment of the invention, an invitation to negotiate RFC 1572 style environment variables is included in Telnet server 50 initial client session establishment. As is illustrated hereafter in FIG. 4 step 150, this is a DO NEW-ENVIRON invitation packaged with a DO TERMINAL TYPE invitation and sent to the client as the first packet of data to flow from server to client. A network station terminal, or any Telnet client 60 taking advantage of the support provided by this invention, responds as is illustrated with steps 152 and 160 with a positive acknowledgment to both of these invitations, causing server 50 to go into subnegotiation for each, as is illustrated by steps 154 and 162. Older clients, those not prepared or wishing to take advantage of the support provided by this invention, respond with a negative acknowledgment. If environment subnegotiation is to take place, the server requests the client to send its VARs (an RFC 1572 predefined set of environment variables) and any USERVARs (a set of user definable variables provided for by RFC 1572.) A telnet server subnegotiation buffer 84 holds environment variables passed from the Telnet client in this way. Four USERVARs defined in connection with this embodiment of the invention hold values for keyboard KBDTYPE 86, code page CODEPAGE 87, character set CHARSET 88, and device name DEVNAME 89, and these are specifically scanned for in the subnegotiation buffer 84. Insofar as this embodiment of the invention is concerned, other VARs and USERVARs sent in by the client are ignored. Any or all of these four values 86–89 can be specified by the client, with the following rules applied by the server to fill in any missing values. If no DEVNAME 89 is supplied, a compatible QPADEVxxxx device is autoselected or created if necessary, and the KBDTYPE 86, CODEPAGE 87, AND CHARSET 88 values are updated to the values passed in or calculated for the current request. If KBDTYPE 86 is specified, but not CHARSET 88 and CODEPAGE 87, compatible values for CODEPAGE 87 and CHARSET 88 are derived. If KBDTYPE 86 is missing, KBDTYPE 86, CODEPAGE 87 and CHARSET 88 are determined from appropriate system values. If DEVNAME 89 only is supplied, and a device 52 by that name has previously been created, and is available, the device will be used as is—that is, the existing KBDTYPE 86, CODEPAGE 87, and CHARSET 88 as previously defined for that named device 52 are used. If DEVNAME 89 only is supplied, and a device 52 by that name does not already exist, the missing parameters are extracted from the appropriate system values, and the device is created subject to the QAUTOVRT system value as in current versions of Telnet. In the case of current clients, KBDTYPE 86, CODEPAGE 87 and CHARSET 88 values are retrieved from system values and DEVNAME 89 is allowed to be autoselected during device creation and initialization. The client Telnet network address 99 is stored by the server 50 in a Device Associated Space (DAS) 98 for retrieval and use by customer applications for remote printing, logging, client access support, and so forth.

In accordance with the invention, new RFC 1572 style USERVAR variables are provided to allow a compliant TELNET client more control over the TELNET server virtual device on, for example, the IBM AS/400 system. These USERVARs allow the client TELNET to create or select a previously created virtual device, and to configure the keyboard, character set, and code page of the device. The USERVARs defined to accomplish this are:

TABLE 1

VIRTUAL DEVICE USERVAR VARIABLES

| USERVAR | VALUE | EXAMPLE |
|---|---|---|
| DEVNAME | us-ascii char(x) | QPADEV0001 |
| KBDTYPE | us-ascii char(3) | USB |
| CODEPAGE | us-ascii char(y) | 437 |
| CHARSET | us-ascii char(y) | 037 | x = up to a maximum of 10 characters
y = up to a maximum of 5 characters

For a description of the use of KBDTYPE, CODEPAGE, and CHARSET, refer to IBM Docket R0997118.

The USERVAR variables defined to allow a TELNET client to create and configure a virtual printer device include the following, which in accordance with a preferred embodiment of the invention are used in conjunction with the variable DEVNAME as will be described hereafter.

TABLE 2

VIRTUAL PRINTER DEVICE USERVAR VARIABLES

| USERVAR | VAL | EXAMPLE |
|---|---|---|
| IBMMSGQNAME | us-ascii char(x) | QSYSOPR |
| IBMMSGQLIB | us-ascii char(x) | QSYS |
| IBMFONT | us-ascii char(x) | 12 |
| IBMFORMFEED | us-ascii char(1) | C \| U \| A |
| IBMBUFFERSIZE | us-ascii char(y) | 4096 |
| IBMTRANSFORM | us-ascii char(1) | 1 \| 0 |
| IBMMFRTYPMDL | us-ascii char(x) | *IBM42023 |
| IBMPPRSRC1 | us-ascii char(1) | 1 \| 2 \| 3 \| . . . \| n |
| IBMPPRSRC2 | us-ascii char(1) | 1 \| 2 \| 3 \| . . . \| n |
| IBMENVELOPE | us-ascii char(1) | 1 \| 2 \| 3 \| . . . \| n |
| IBMASCII899 | us-ascii char(1) | 1 \| 0 |
| IBMWSCSTNAME | us-ascii char(x) | *NONE |
| IBMWSCSTLIB | us-ascii char(x) | *LIBL | x = up to a maximum of 10 characters
y = up to a maximum of 5 characters

Telnet receives a device specific datastream and sends it to the virtual device on the AS/400. The virtual device processes the data and builds a corresponding datastream that is returned to the client. Depending on the virtual device name selected, the datastream can be in a specific NLS language, running under a custom job sub-system, and so forth. Thus, work management is controlled on the AS/400 through the selection of virtual devices.

Figure 3:
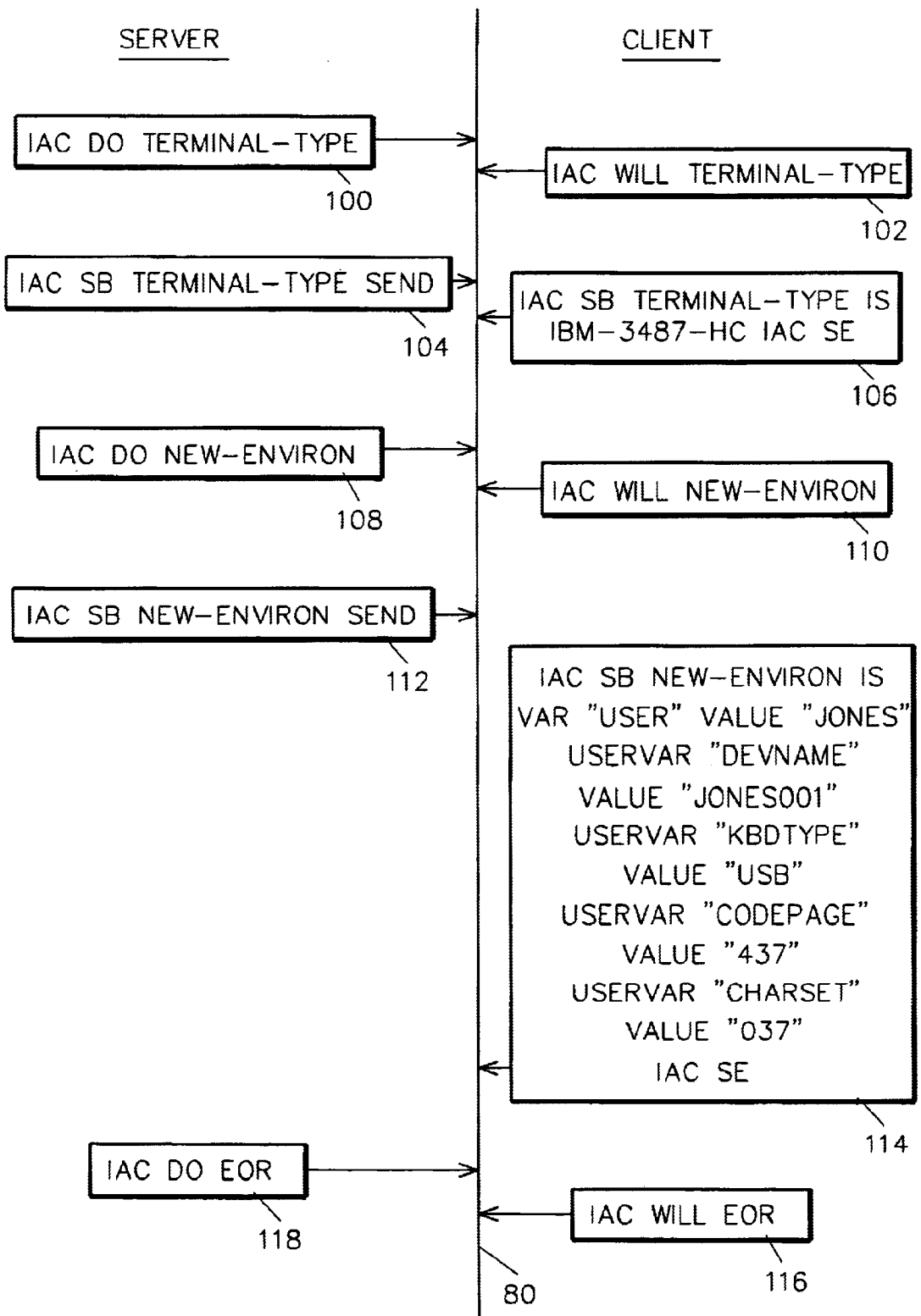
FIG. 3 is a flow diagram illustrating the exchange of messages setting up a new environment for a display device having a specific, client requested device name.

Referring to FIG. 3, in accordance with the invention, a user specifies a virtual device name of a Telnet session through a new option negotiation handshaking sequence. The Telnet server informs the Telnet Client that a "NEW-ENVIRON" option can be negotiated. This option allows the Client application to negotiate with the Server to pick a device name that the Client wants. This negotiation includes the following steps.

In step 100, server 50 sends the Telnet command "DO TERMINAL-TYPE" to client 60.

In step 102, client 60 responds with the Telnet command "WILL TERMINAL-TYPE".

In step 104, server 50 sends the sub-negotiation command "SB TERMINAL-TYPE SEND" for the terminal-type option.

In step 106, client 60 responds to the sub-negotiation terminal type command 104 by sending any valid supported terminal type, herein illustrated as "SB TERMINAL-TYPE IS IBM-3487-HC IAC SE".

In step 108, in this exemplary embodiment, server 50 tests if client 60 is capable of handling negotiations by sending the Telnet command "DO NEW-ENVIRON". Alternatively, this command may be bundled with the "DO TERMINAL-TYPE" command in step 100.

In step 110, client 60 responds to the "DO NEW-ENVIRON" command with (1) "WILL NEW-ENVIRON", if it supports the method of the invention, or (2) "WONT NEW-ENVIRON", if it does not.

In step 112, server 50 sends the sub-negotiation command for the environment option "SB NEW-ENVIRON SEND".

In step 114, client 60 responds by passing up environment option information, including in this example values for the variables USER and device name (DEVNAME). In this specific example for negotiating a device name which is a display terminal, keyboard type (KBDTYPE), code page (CODEPAGE), and character set (CHARSET) are also communicated. In this response, client 60 reflects appropriate values for each of these parameters based upon a language and/or device name and sends this information to server 50 via environment option variables.

Server 50 uses the environment option information passed in step 114 from client 60 to select or create a virtual device description 52.

In step 118, server continues with normal transparent mode negotiations. (Alternatively, when the "DO NEW-ENVIRON" command is bundled in step 100, this "DO EOR" command may sent before step 110, in which case client 60 would first respond to the deferred NEW-ENVIRON request and defer responding to the DO EOR to step 116.)

In steps 118, 116, assuming negotiation of the environment option completes successfully, server 50 and client 60 proceed to negotiations of other Telnet options, such as end of record (EOR) and binary, required to initiate a Telnet session.

In accordance with a preferred embodiment of the invention, TCP/IP printer support is provided by tunneling printer datastreams to, for example, AS/400 5250 virtual printer devices over a Telnet connection. Under the RFCs, Telnet printer datastreams are not necessarily distinguished from display datastreams. Telnet routes datastreams to a virtual device and does no interpretation of the datastream itself. By default, this device is a display type device, and the particular type of display is negotiated between the client and server.

The key to TCP/IP printer support is to enable Telnet clients to negotiate a virtual printer device. A Telnet client negotiates with a Telnet server a virtual terminal device of a specific device type under RFC 884. (Listings of supported device types appear in RFC 1700; and in IBM publication SC41-5420 (V4R1), TCP/IP Configuration and Reference, in the Full Screen Workstation Mappings Table; and in IBM publication SC41-3420.

In further accordance with this aspect of the invention, printer support is expanded by using the Telnet Environment Option (RFC 1572) to specify special printer settings or values to be used, provided the Telnet server supports RFC 1572. Once the client is connected to the printer device, print datastreams that exploit new or sophisticated features for that printer device can be sent.

Figure 4:
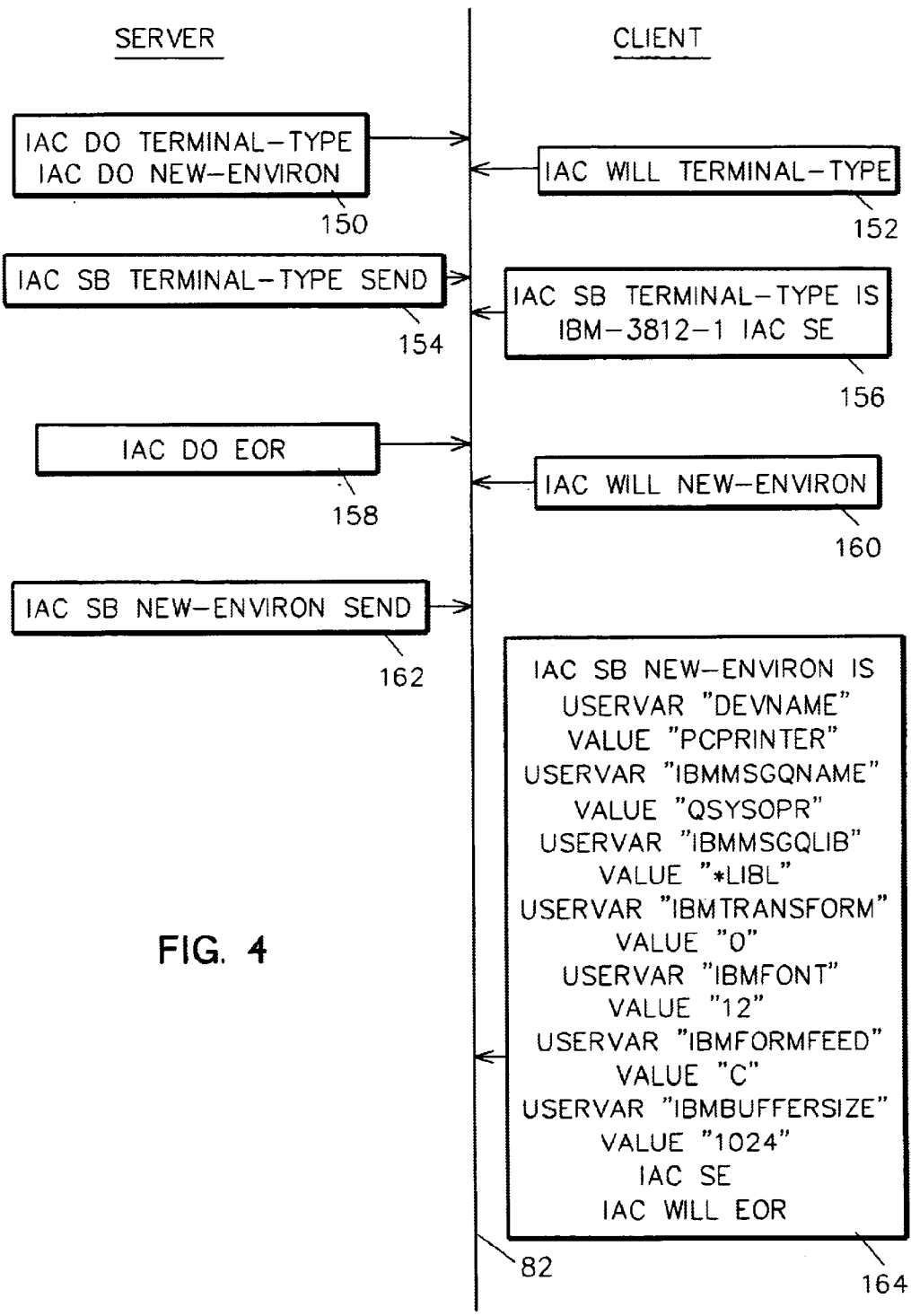
FIG. 4 is a flow diagram illustrating the exchange of messages setting up a new environment for a printer device having a specific, client requested device name.

Referring to FIG. 4, the process steps for negotiating a printer device name are set forth. In step 150, Telnet server 50 informs the Telnet Client 70 that a "NEW-ENVIRON" option can be negotiated. This option allows Client application 70 to negotiate with Server 50 to pick a printer device name 53, 55 or the like, that Client 70 wants. This negotiation includes the following steps.

In step 150, server 50 sends the Telnet commands "DO TERMINAL-TYPE" and "DO NEW-ENVIRON" to client 70.

In step 152, client 70 responds with the Telnet command "WILL TERMINAL-TYPE".

In step 154, server 50 sends-the sub-negotiation command "SB TERMINAL-TYPE SEND; to which client 70 responds in step 156 is the command "IAC SB TERMINAL-TYPE IS <terminal type>", and the subnegotiation end command "IAC SE", where <terminal type> in this example is "IBM-3812-1", which is a printer.

In step 158 server 50 proceeds to issue "IAC DO EOR". However, as server 50 had previously, in step 150, indicated a willingness to negotiate a new environment, in step 160 client 70 communicates that, rather proceeding with the EOR negotiation, it prefers to negotiate the new environment by communicating "IAC WILL NEW-ENVIRON". To this, in step 162, server responds with "IAC SB NEW-ENVIRON SEND".

In step 164, client 70 communicates its desire to obtain a particular device name (IAC SB NEW-ENVIRON IS USERVAR "DEVNAME" VALUE "PCPRINTER"), several other aspects of the environment (including USERVARs IBMMSGQNAME, IBMMSGQLIB, IBMTRANSFORM, IBMFONT, IBMFORMFEED and IBMBUFFERSIZE), terminates the new environment subnegotiation commands with "IAC SE" and, responding to the server command issued in step 158, indicates its willingness to next negotiate the EOR parameter by issuing "IAC WILL EOR".

Server 50 uses the environment option information passed in step 164 from client 70 to select or create a virtual printer device description 55.

Thereafter, assuming negotiation of the environment option completes successfully, server 50 and client 70 proceed to negotiate other Telnet options, including in this specific example the EOR parameter.

Figure 5:
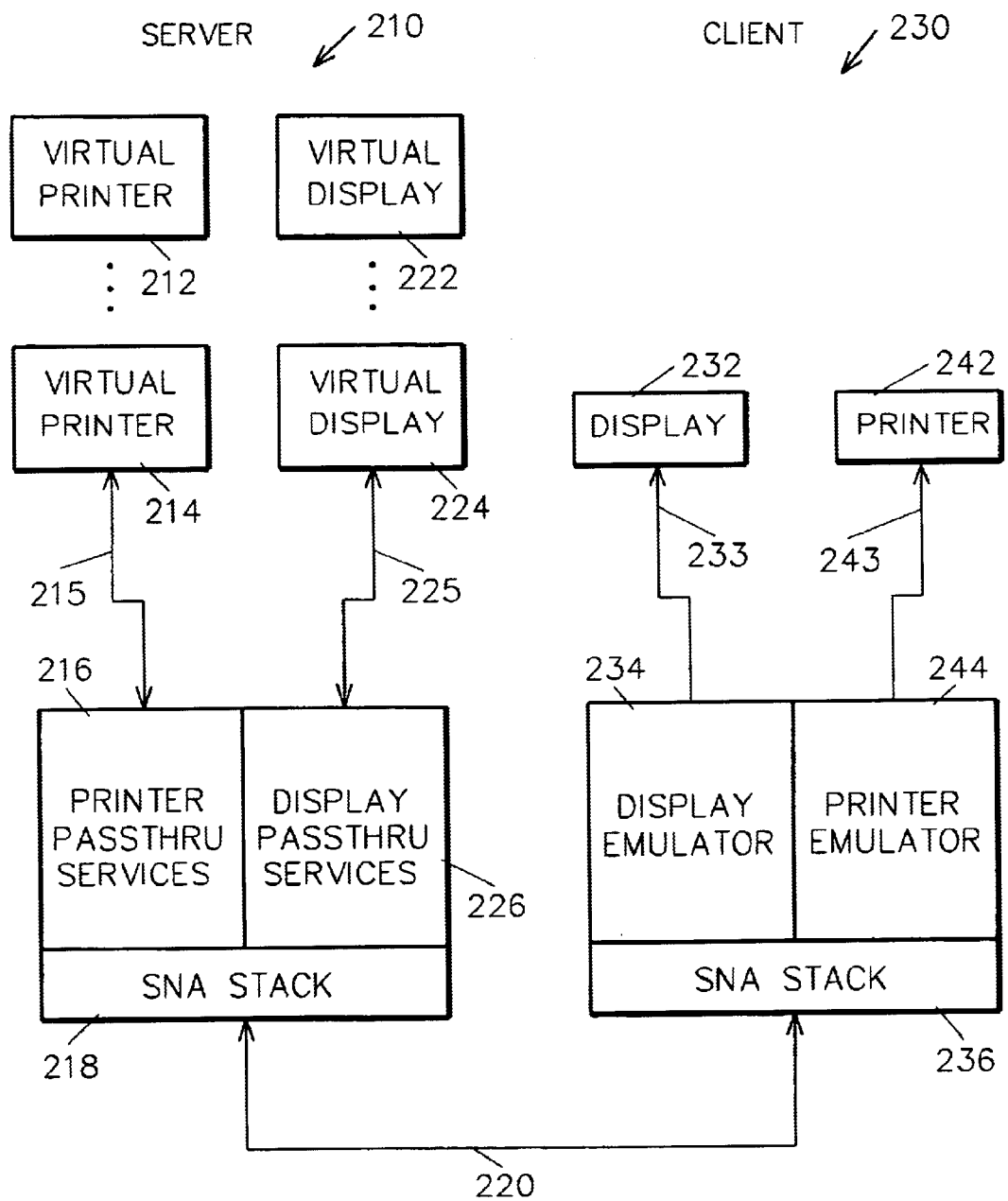
FIG. 5 is a high level system diagram of an SNA client/server system in accordance with the prior art.
Figure 6:
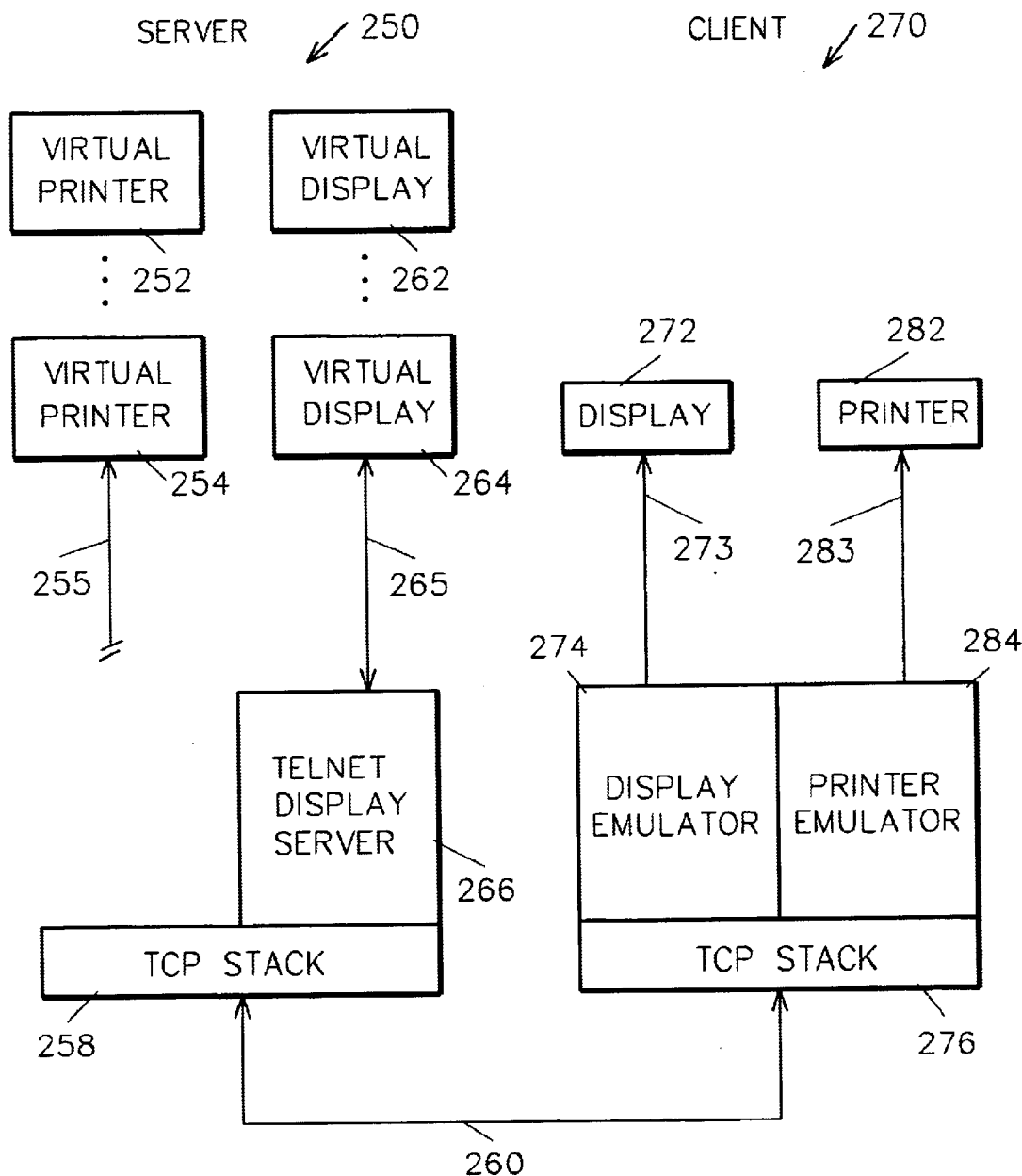
FIG. 6 is a high level system diagram of a prior art TCP/IP client server system.
Figure 7:
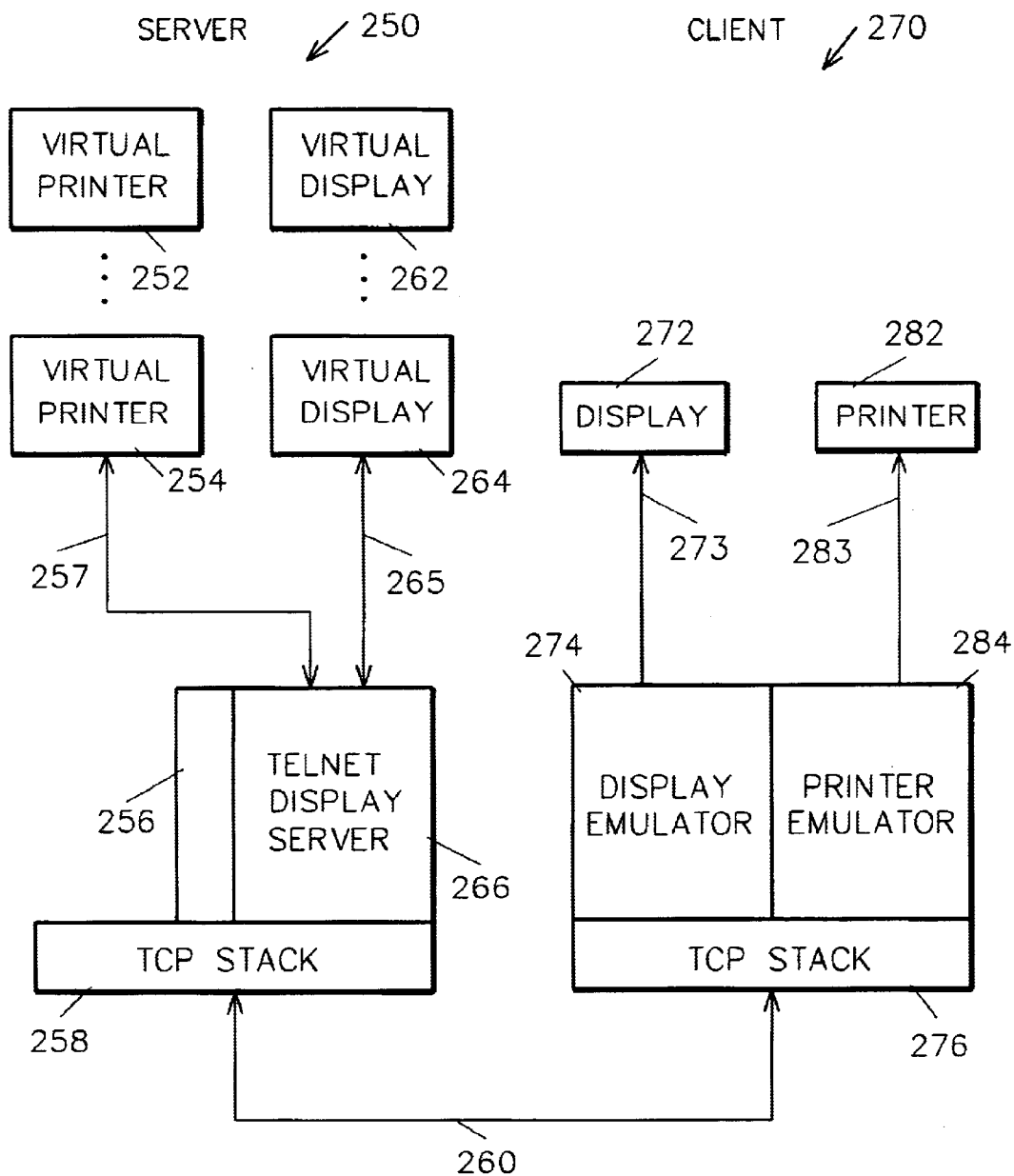
FIG. 7 is a high level system diagram of a TCP/IP client server system in accordance with the invention.
Figure 8A:
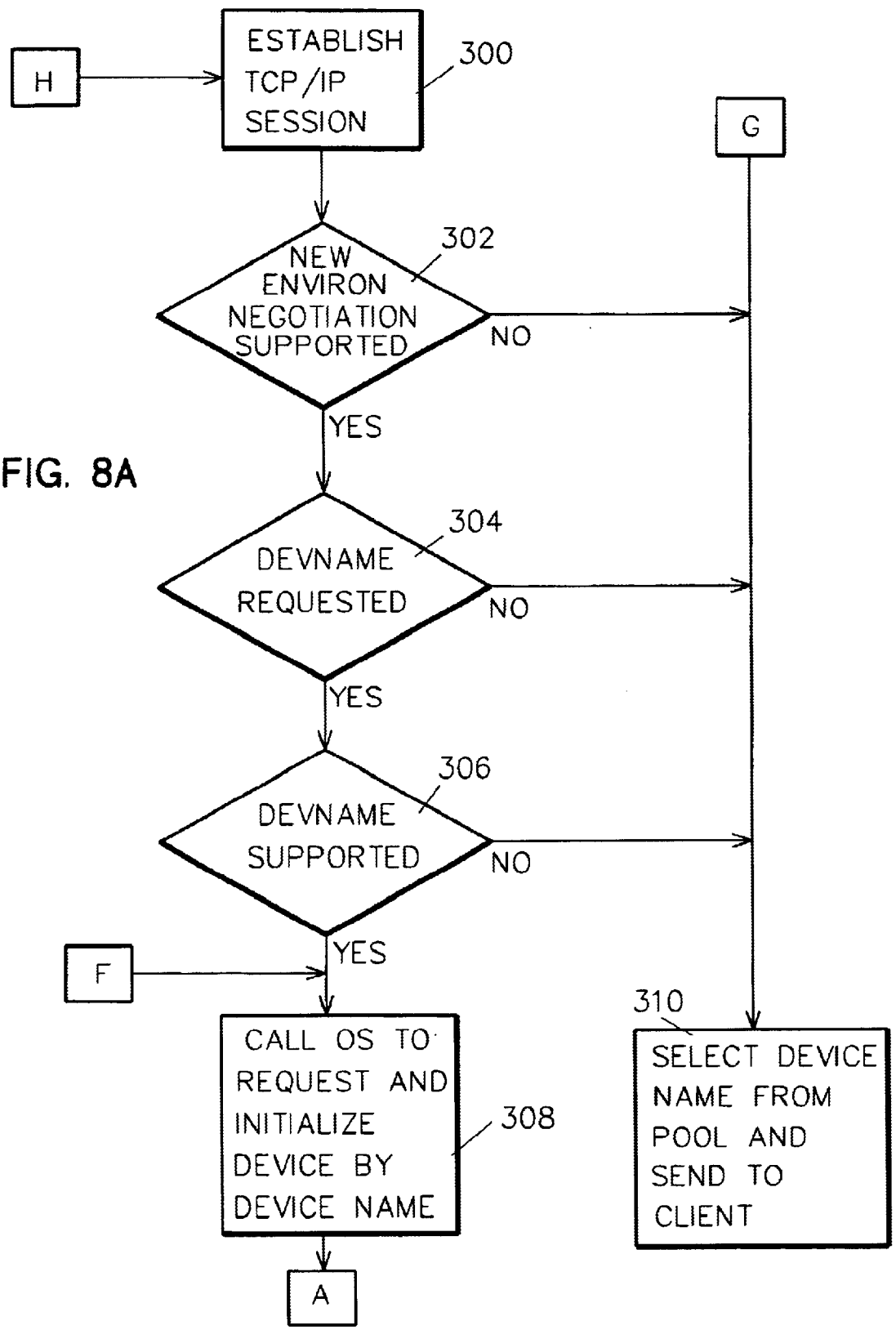
FIGS. 8A through 8E are flow diagrams illustrating certain selected aspects of various embodiments of the invention.
Figure 8B:
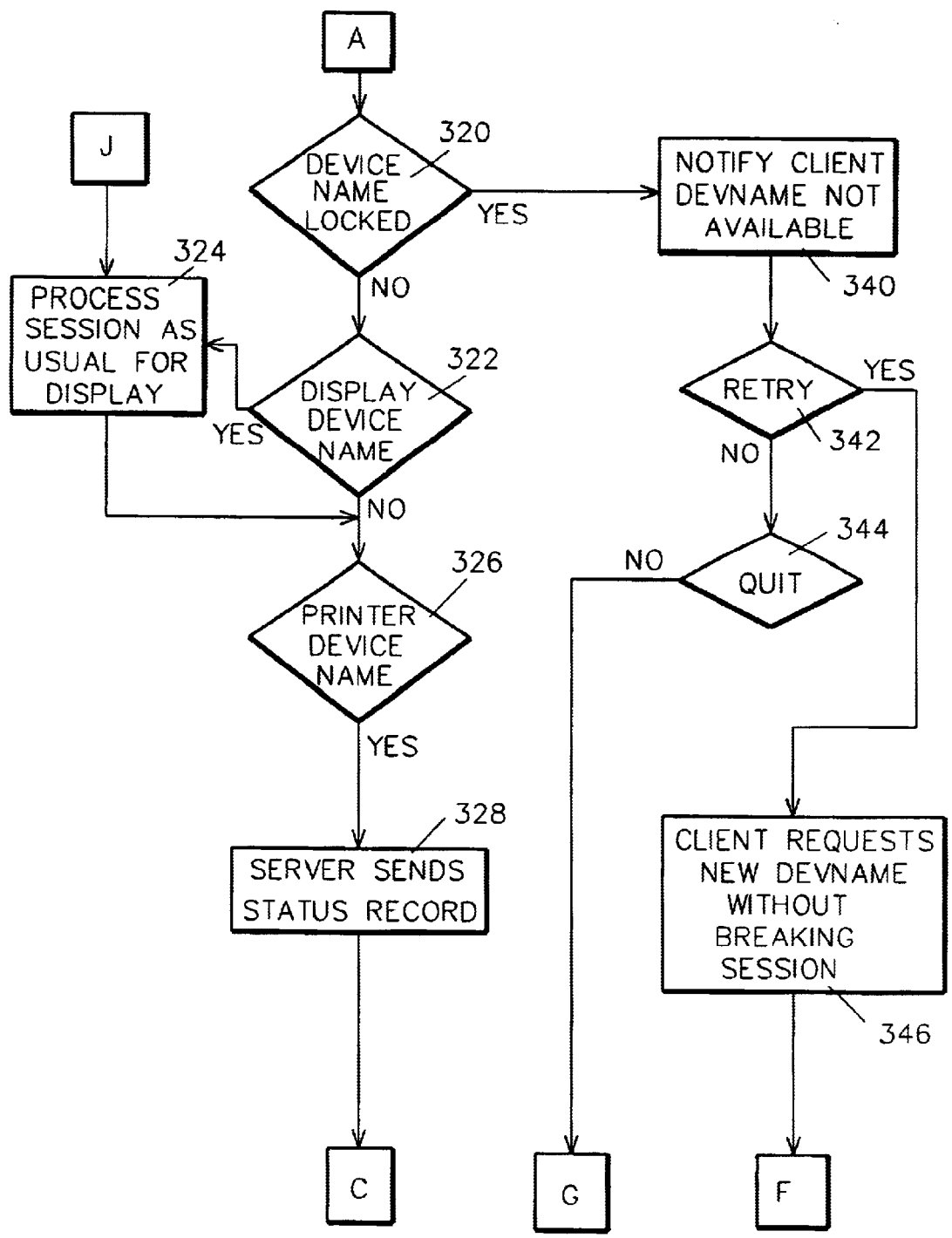
Figure 8C:
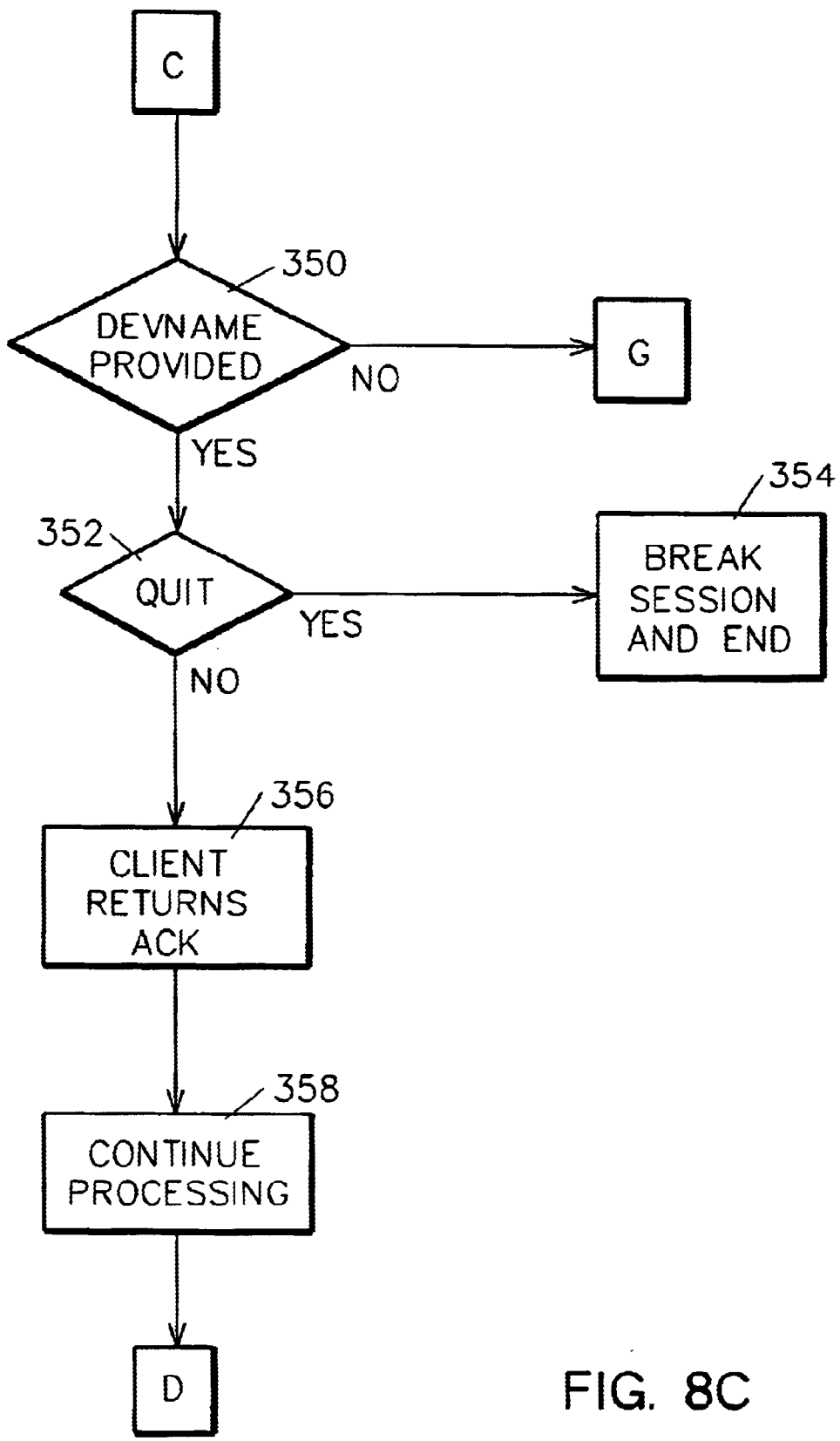
Figure 8D:
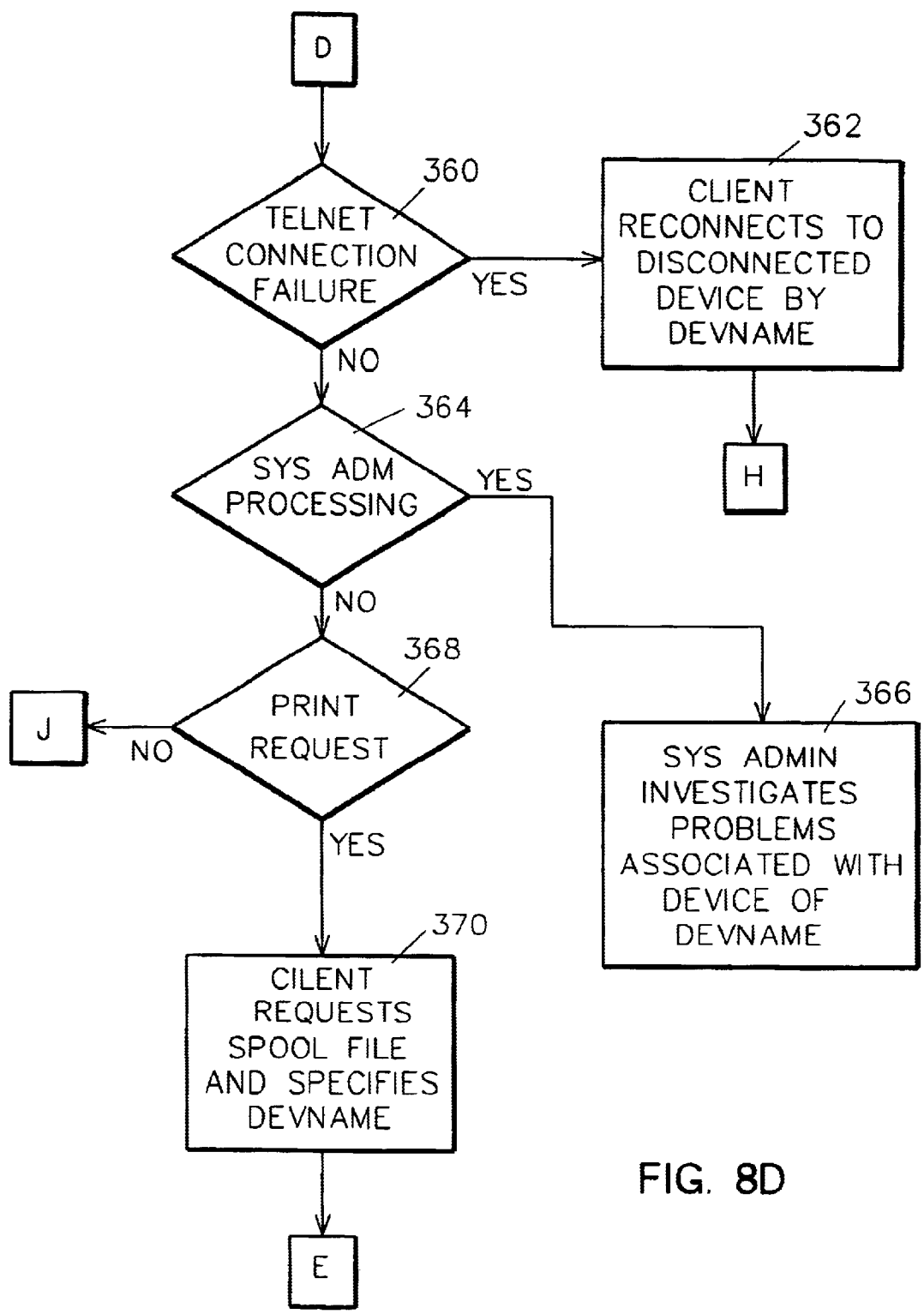
Figure 8E:
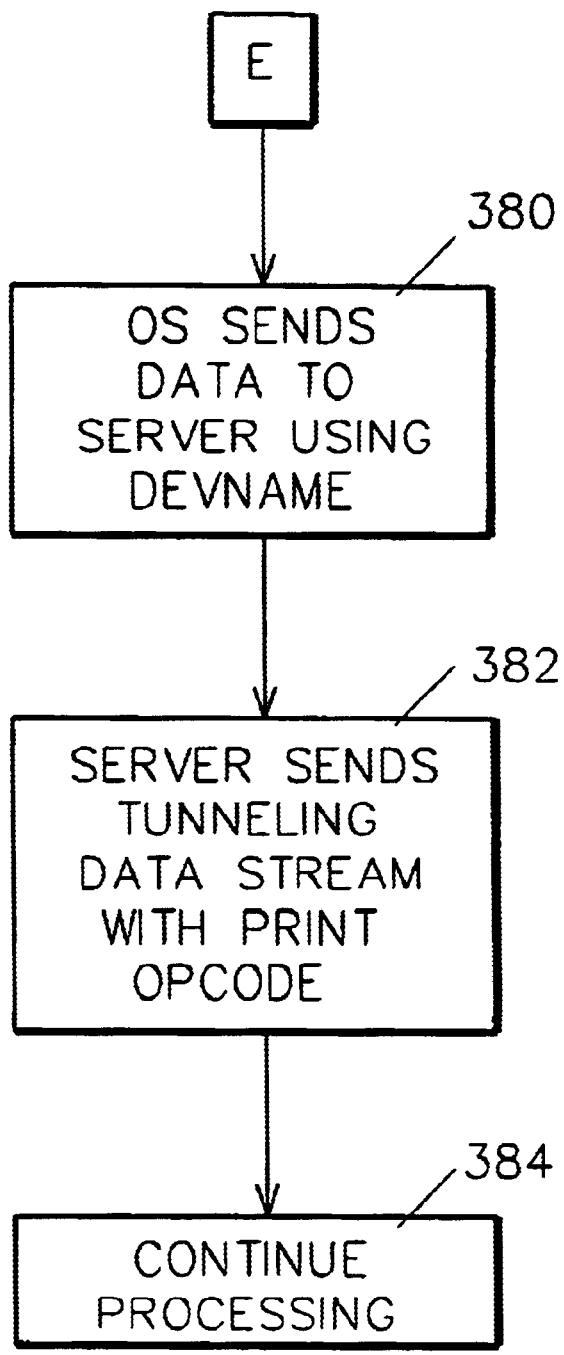

In FIG. 5 is illustrated the prior art printer pass thru support provided by SNA by using specially developed printer services. In FIG. 6 is illustrated how TCP/IP is supports a virtual display, but does not support a virtual printer. In FIG. 7 is illustrated the system of the invention for supporting both virtual displays and virtual printers in a TCP/IP environment, which simplifies implementation by using device name selection.

Referring to FIG. 5, server 210 includes a plurality of virtual printers 212, 214 connected as is represented by line 215 to printer pass thru services 216 and thence to SNA stack 218; and a plurality of virtual display devices 222, 224 connected as is represented by line 225 to display pass thru services 226 and thence to SNA stack 218. Client 230 includes physical display 232 and physical printer 242 connected by lines 233, 243 to display emulator 234 and printer emulator 244, respectively. These interface with SNA stack 236 and communication line 220 with SNA stack 218.

Referring to FIG. 6, virtual devices 262, 264 at server 250 interface Telnet display server 266, as is represented by line 265. However, in a TCP/IP environment, there is no provision for supporting virtual printer devices, such as 252, 254 and, consequently, line 255 is broken. Client display device 272 and printer device 282 are connected by lines 273 and 283 to display emulator 274 and printer emulator 284, respectively. TCP stacks 258 and 276 at server 250 and client 270, respectively, communicate over line 260.

Referring to FIG. 7, in accordance with a preferred embodiment of the invention, Telnet display server 266, including minimal code changes 256, is enabled, by use of device name selection, to communicate directly with virtual printer 254, as is represented by line 257, by allowing printer datastreams to take the path provided for existing display support. Code changes 256 are required to map printer op codes 01 (PRINT) and 02 (CLEAR), to distinguish them from display op codes 01 and 02 within in server 266. (However, these op codes need not be distinguished at client 270, for the data stream is fed either to display emulator 274 or to printer emulator 284.)

Referring to FIGS. 8A through 8E, a flow diagram is presented illustrating various aspects of various embodiments of the invention.

In step 300, Telnet client 60 and server 50 establish a TCP/IP session, including in this exemplary embodiment negotiating End-of-Record, Binary, and Terminal-Type.

In step 302, the determination is made whether both server 50 and client 60 support and desire to use new environment negotiations, as previously described in connection with steps 108 and 110, FIG. 3.

In steps 304 and 306, if client 60 requests DEVNAME, and if server 50 supports DEVNAME processing, in step 308 server 50 requests of the operating system that it initialize virtual device 52 with DEVNAME. Otherwise, in step 310 operation continues as in the prior art, with the operating system being accessed to provide a device name for virtual device 52 selected from a pool of device names, or otherwise defined.

In steps 320 and 340, if the requested DEVNAME is locked, server 50 is notified and in steps 342 and 346 given the opportunity to retry by requesting a new DEVNAME without breaking the session initiation connection in step 300. On the other hand, client 60 may, in step 344, either quit (terminate the session) or request that in step 310 a device name be selected from the pool to continue processing.

In steps 322 and 324, if the DEVNAME selected is for a display type, processing continues as normal. On the other hand, if the DEVNAME selected is for a printer type, in steps 326 and 328, server 50 sends a startup confirmation record, or status record, to client 60 including a return code to the client indicating whether or not the connection session request was successful, the system name, and the device name that the system decided to use. (If the device name had not been specifically requested by client 60, as previously described, OS finds a device that matches the requested terminal type. If it can't find a good match in its pool, OS will create a printer driver and give it a generic name, which will be passed back to client 60 in the status message. If client 60 had requested a specific device name, the status message contains verification that the name had been accepted.) In step 350, if the requested DEVNAME had not been accepted or provided, client 60 can request or expect to receive a device name from the pool in step 310.

In steps 352 and 356, if client 60 receives in the status message the DEVNAME requested, in step 356 it returns an ACK message and continues processing normally. Otherwise, in step 354, it would break the session connection and end.

In step 360, if there is a connection failure, or if the session had otherwise terminate normally or abnormally, in step 362, client 60 may reconnect to the disconnected device by DEVNAME, picking up the process at step 300 to initiate a new session.

Steps 364 and 366 illustrate that in the event that there is a problem with the device associated with DEVNAME, the system administrator may log on to a session requesting DEVNAME in order to investigate the problem.

In steps 368 and 324, both client 60 and server 50 operate as usual until there is a print request from the user logged on to the operating system. In steps 368 and 370, the user requests a print job, specifying the spool file 40 to be printed and the virtual print device DEVNAME PRINTER1 53 to print it to.

In step 380, the operating system responds by sending data associated with spool file 40 to server 50 virtual device 52 with DEVNAME PRINTER1 53 in, for example, SNA format.

In step 382, server 50 virtual device 53 sends the data stream to client 60 driver 66 as a tunneling data stream with an RFC 1205 header including a print code in the OPCODE field 138.

In step 384, client 60 continues processing, replying with an RFC 1205 header with no data 142 and an OPCODE 138 of print complete. If client 60 was unable to print because intervention is required (for example, if printer 92 is out of paper, or the printer operator had paused printing), client 60 would respond with an RFC 1205 message including an OPCODE 138 of print complete (for recoverable conditions) or cancel (for non-recoverable conditions), together including flags and sense bytes 133–137 and, possibly, data 142, with diagnostic information.

Some systems, such as the IBM AS/400 system, manage users by device name. In accordance with such an approach to work management, when a user logs on to the system as an interactive user at terminal 60, certain default characteristics are communicated to the logon screen 90. Also, in such systems, the system administrator may define several subsystems 50 and specify where (which subsystem) a particular-user's 60 interactive job will run based on that device name. This allows the user or the system administrator to tailor the system so as to choose such things as language and panel formats depending upon the location of the display 90 associated with a requested device name. Thus, a user traveling in Europe may request that messages on physical display device 90 in Germany associated with a virtual device name 54 use the German language, and a physical device 94 in his home office England associated with a different device name 56 use the English language. While such processing is available for some function rich environments, such as SNA, the present invention provides such in a simple, Telnet environment and does such in a way which allows easy migration from SNA to TCP/IP as customers convert from SNA to TCP/IP and are enabled thereby to run all their applications over TCP/IP networks instead of SNA by configuring and setting up the TCP/IP network.

Further in accordance with the invention, whereas under LPR/LPD RFC 1179 processing, only ASCII printers are supported, by creating and naming a virtual printer device as heretofore described, any printer can be supported by selecting manufacturer type and model parameters and/or creating a customizing object to define a special printer during subnegotiation.

ADVANTAGES OVER THE PRIOR ART

The advantages of the method of the preferred embodiment of this invention include the provision of a method for migrating from an SNA to a TCP/IP environment without loss of work management functionality.

It is a further advantage of the invention that TCP/IP printer support is implemented in a function rich environment, such as the IBM AS/400, by exploiting 5250 device name support through Telnet.

It is a further advantage of the invention that a pure TCP/IP solution is provided in an open architecture for full printer support of existing and all kinds of new printers, such as mobile clients, smart cards, and so forth, without the necessity of installing other protocol software, allowing customers to shed their dependence on non-TCP/IP or proprietary solutions.

ALTERNATIVE EMBODIMENTS

It will be appreciated that, although specific embodiments of the invention have been described herein for purposes of illustration, various modifications may be made without departing from the spirit and scope of the invention.

Further in particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for printing to a virtual printer device in a system including a server and a remote client, each said server and said remote client architected to include at least a physical layer and an application layer, comprising the steps of:

establishing a direct persistent application layer connection between said remote client and said server;

establishing agreement between said server and said remote client to negotiate at said application layer connection device protocol options;

communicating a printer name across said application layer connection from said remote client to said server for a virtual printer at said server associated with a printer device at said remote client;

operating a display server at said server selectively for communicating with a virtual display and, responsive to a user request for printing a file, for communicating a printer data stream generated at said server over said direct persistent application layer connection from said virtual printer at said server to said printer device at said remote client.

2. The method of claim 1 wherein said step of establishing agreement comprises the further steps executed across said direct persistent application layer connection of:

communicating do-terminal-type and do-new-environment invitations from said server to said remote client;

communicating acknowledgment of said invitations from said remote client to said server;

and wherein said step of communicating a printer device name comprises the further steps of:

entering a subnegotiation session including the steps of:

communicating from said server to said remote client a request for predefined environment variables and for user definable variables;

responsive to said request, communicating from said remote client to said server said printer device name as a user definable variable.

3. Method for client selection of a virtual terminal device in a system including a server and a remote client, said server and said client each being architected to include at least a physical layer and an application layer, comprising the steps of:

establishing an application layer connection across said application layers between said remote client and said server;

establishing agreement between said server and said remote client to negotiate options;

communicating a device name from said remote client to said server for a virtual printer device associated with said remote client; and receiving across said application layer connection from said server tunneling data streams selectively comprising display data or a printer data stream printable without modification at said remote client.

4. The method of claim 3 wherein said step of establishing agreement comprises the further steps executed across said application layer connection of:

communicating do-terminal-type and do-new-environment invitations from said server to said remote client;

communicating acknowledgment of said invitations from said remote client to said server;

and wherein said step of communicating a device name comprises the further steps of:

entering a subnegotiation session including the steps of:

communicating from said server to said remote client a request for predefined environment variables and for user definable variables;

responsive to said request, communicating from said remote client to said server said device name as a user definable variable.

5. Method for operating a server in a system including said server and at least one remote client, each said server and said client being architected to include at least a physical layer and an application layer, to print to a virtual device named by said client, comprising the steps of:

accepting a persistent application layer connection across said application layer with said client;

establishing across said application layer connection agreement with said client to negotiate options;

responsive to said agreement, receiving from said client and loading into a subnegotiation buffer a parameter string including one or more predefined variables and user definable variables;

scanning said subnegotiation buffer for a user definable variable specifying a device name for a virtual printer device at said server associated with physical printer device said client;

operating a display server selectively for communicating across said persistent application layer connection with said virtual display device and, responsive to a user request for printing a file, for communicating with said virtual printer device at said server.

6. Method for operating a client in a system including a remote server to name and print from a virtual printer device at said remote server associated with said client, each said server and client architected to include an application layer and a physical layer, comprising the steps of:

establishing a persistent application layer connection with said server;

establishing agreement with said server to negotiate at said application layer device protocol options;

responsive to said agreement, sending across said application layer connection to said remote server a parameter string including a printer device name as one of one or more predefined variables and user definable variables.

7. A program storage device readable by a machine, tangibly embodying a program of instructions executable by a machine to perform method steps for a client in a system including a remote server selectively to name and print from a virtual printer associated with said client, each said server and said client architected to include a plurality of layers including at least an application layer and a physical layer, said method steps comprising:

establishing a persistent application layer connection with said server;

establishing agreement with said server to negotiate device protocol options;

responsive to said agreement, sending across said application layer connection to said server a parameter string including a printer device name as one of one or more predefined variables and user definable variables.

8. A program storage device readable by a machine, tangibly embodying a program of instructions executable by a machine to perform method steps for a server in a system including at least one remote client to enable said client to name and print from a virtual printer associated with said client, each said server and said client architected to include a plurality of layers including at least an application layer and a physical layer, said method steps comprising:

accepting a persistent application layer connection with said client;

establishing agreement with said client to negotiate device protocol options across said application layer connection;

responsive to said agreement, receiving from said client and loading into a subnegotiation buffer a parameter string including one or more predefined variables and user definable variables;

scanning said subnegotiation buffer for a user definable variable specifying a device name for a virtual printer device associated with said client;

operating a display server selectively for communicating across said application layer connection with a virtual display device and, responsive to a user request for printing a file, for communicating a data stream generated at said server to said virtual printer device for printing at said client.

9. A client in a system including a remote server, each said client and said server architected to include a plurality of layers including an application layer, comprising:

means for establishing a persistent application layer connection with said remote server;

means for establishing agreement with said remote server to negotiate device protocol options across said application layer connection;

means responsive to said agreement for sending to said remote server a parameter string including a printer device name as one of one or more predefined variables and user definable variables.

10. A server in a system including said server and at least one remote client, each said server and said client having an application level and a physical level, to enable said client to name and print from a virtual printer located at said server and associated with said client, comprising:

means for accepting a persistent connection at said application level with said client;

means for establishing agreement with said client to negotiate device protocol options across said persistent connection;

means responsive to said agreement for receiving from said client and loading into a subnegotiation buffer a parameter string including one or more predefined variables and user definable variables;

means for scanning said subnegotiation buffer for a user definable variable specifying a device name for a virtual printer device at said server associated with said client;

means for operating a display server selectively for communicating with a virtual display device at said application level and, responsive to a user request for printing a file, for communicating with said virtual printer device.

11. Method for printing across an application layer in a system including a server and at least one client, comprising the steps of:

establishing across said application layer a first interactive display session;

naming a virtual printer at said server associated with a printer device at said client during said first interactive session;

optionally terminating said first interactive display session;

during the establishment of a second printer interactive session across said application layer, said client selecting said virtual printer; and during both said interactive sessions, operating a display server selectively for communicating with a virtual display device and, responsive to a user request for printing a file, for communicating a printer data stream from said virtual printer at said remote server for printing without conversion at said printer device.

12. Method for operating a server selectively to transmit a display data stream or a printer data stream to a remote client across the application layer of a system including a plurality of layers, comprising the steps of:

accepting a request from said client to establish a persistent application layer connection between said client and said server;

accepting agreement with said client to negotiate device protocol options;

receiving across said persistent application layer connection a printer name from said client for a virtual printer at said server associated with a printer device at said client;

operating a display server at said server selectively for transmitting across said persistent application layer connection said display data stream and responsive to a user request for printing a file for transmitting said printer data stream from said virtual printer to said printer device.

13. Method for operating a client selectively to receive a display data stream or a printer data stream from a remote server, comprising the steps of:

accepting a persistent application layer connection with said server;

accepting agreement with said server to negotiate device protocol options;

communicating across said application layer connection a printer name to said server for a virtual printer at said server associated with a printer device at said client;

selectively receiving across said application layer connection a display data stream from a display server at said server or receiving a printer data stream from said display server at said server for printing without conversion at said printer device.

* * * * *